US006460766B1

(12) United States Patent
Olschafskie et al.

(10) Patent No.: US 6,460,766 B1
(45) Date of Patent: Oct. 8, 2002

(54) GRAPHIC SYMBOLS AND METHOD AND SYSTEM FOR IDENTIFICATION OF SAME

(76) Inventors: Francis Olschafskie, 46 Atherton St., Boston, MA (US) 02119; Allan Chasanoff, 117 E. 36th St., New York, NY (US) 10016

( * ) Notice: Subject to any disclaimer, the term of this patent is extended or adjusted under 35 U.S.C. 154(b) by 0 days.

(21) Appl. No.: 09/527,995

(22) Filed: Mar. 17, 2000

Related U.S. Application Data

(63) Continuation-in-part of application No. 08/738,813, filed on Oct. 28, 1996, now abandoned.

(51) Int. Cl.⁷ ............................................. G06K 7/10
(52) U.S. Cl. .................. 235/454; 235/453; 235/494; 235/462; 235/472
(58) Field of Search ................. 235/453, 454, 235/494, 462, 472

(56) References Cited

U.S. PATENT DOCUMENTS

| | | | |
|---|---|---|---|
| 3,832,686 | * 8/1974 | Bilgutay | 235/61 |
| 3,958,816 | 5/1976 | Remmey, III | 283/38 |
| 4,183,465 | * 1/1980 | Dobras | 235/494 |
| 4,954,699 | 9/1990 | Coffey et al. | 235/462 |
| 4,992,650 | 2/1991 | Somerville | 235/462 |
| 5,038,393 | 8/1991 | Nanba | 382/61 |
| 5,062,666 | 11/1991 | Mowry et al. | 283/67 |
| 5,227,616 | 7/1993 | Lee | 235/462 |
| 5,229,584 | 7/1993 | Erickson | 235/375 |
| 5,301,243 | 4/1994 | Olschafskie et al. | 382/59 |
| 5,324,922 | 6/1994 | Roberts | 235/375 |
| 5,380,998 | * 1/1995 | Bossen et al. | 235/494 |
| 5,395,181 | 3/1995 | Dezse et al. | 400/103 |
| 5,396,564 | 3/1995 | Fitzpatrick et al. | 382/11 |
| 5,412,188 | 5/1995 | Metz | 235/375 |
| 5,430,558 | 7/1995 | Sohaei et al. | 358/473 |
| 5,451,760 | 9/1995 | Renvall | 235/462 |
| 5,465,291 | 11/1995 | Barrus et al. | 379/67 |
| 5,480,306 | 1/1996 | Liu | 434/156 |
| 5,486,686 | 1/1996 | Zdybel, Jr. et al. | 235/375 |
| 5,507,527 | * 4/1996 | Tomioka et al. | 235/494 |
| 5,521,368 | 5/1996 | Adachi | 235/462 |
| 5,574,804 | 11/1996 | Olschafskie et al. | 382/313 |
| 5,596,652 | 1/1997 | Piatek et al. | 382/115 |
| 5,640,193 | 6/1997 | Wellner | 348/7 |
| 5,754,308 | 5/1998 | Lopresti et al. | 358/403 |
| 5,760,382 | 6/1998 | Li et al. | 235/436 |
| 5,781,914 | 7/1998 | Stork et al. | 707/506 |
| 5,835,625 | * 11/1998 | Fitzpatrick et al. | 382/165 |
| 5,869,819 | 2/1999 | Knowles et al. | 235/375 |
| 5,875,261 | 2/1999 | Fitzpatrick et al. | 382/165 |
| 5,897,648 | 4/1999 | Henderson | 707/530 |
| 5,899,700 | 5/1999 | Williams et al. | 434/308 |
| 5,920,877 | 7/1999 | Kolster | 707/512 |
| 5,945,656 | 8/1999 | Lemelson et al. | 235/462.01 |
| 5,999,666 | * 12/1999 | Gobeli et al. | 382/313 |
| 6,036,094 | * 3/2000 | Goldman et al. | 235/462 |
| 6,095,418 | 8/2000 | Swartz et al. | 235/462.01 |
| 6,134,338 | * 10/2000 | Solberg et al. | 382/113 |

FOREIGN PATENT DOCUMENTS

| | | | |
|---|---|---|---|
| EP | 2 494 873 | 11/1980 | G06K/11/06 |
| WO | WO-96/37861 | * 11/1996 | |

OTHER PUBLICATIONS

U.S. Ser. No. 09/565,799, J. A. Franklin, Mar. 4, 2002.

* cited by examiner

Primary Examiner—Thien M. Le
Assistant Examiner—Seung H Lee
(74) Attorney, Agent, or Firm—Bromberg & Sunstein LLP (57) ABSTRACT

A system combines and integrates the graphic symbols of a document with spatial symbology. A scanning device, such as an optical scanner, and a microprocessor in communication with the scanning device enable a user to retrieve and manipulate desired sections of the document for later use or physical electronic production.

57 Claims, 11 Drawing Sheets

FIG. 6 abcdefghijklmnopqrstuvwxyz
abcdefghijklmnopqrstuvwxyz
abcdefghijklmnopqrstuvwxyz
abcdefghijklmnopqrstuvwxyz
abcdefghijklmnopqrstuvwxyz
abcdefghijklmnopqrstuvwxyz
abcdefghijklmnopqrstuvwxyz —72
abcdefghijklmnopqrstuvwxyz
abcdefghijklmnopqrstuvwxyz
abcdefghijklmnopqrstuvwxyz —72
abcdefghijklmnopqrstuvwxyz
abcdefghijklmnopqrstuvwxyz
abcdefghijklmnopqrstuvwxyz —72
abcdefghijklmnopqrstuvwxyz
abcdefghijklmnopqrstuvwxyz

GRAPHIC SYMBOLS AND METHOD AND SYSTEM FOR IDENTIFICATION OF SAME

This application is a Continuation-in-Part of application Ser. No. 08/738,813 filed Oct. 28, 1996, now abandoned which is hereby incorporated herein by reference.

TECHNICAL FIELD

The present invention relates to a method for note taking information from documents. In particular, the invention relates to graphics containing machine readable spatial symbology.

BACKGROUND ART

Non-electronic methods for taking notes from books, documents, and other printed materials are generally slow or unreliable. Students, lawyers, and other people dependent upon prior authority have limited resources by which they may select desired portions of a document and reproduce them quickly and accurately. Generally, this requires marking selected passages from printed documents with tabs or highlighters and reproducing them manually at a later time. For example, U.S. Pat. No. 3,958,816 to Remmey, III discloses notation related book markers wherein double sided tabs may be adhered to pages of books. Numbers are written in opposite directions on opposite sides of the tab so that the tab may be affixed to a left or right page of a book to mark the page, and the point on the page, to which it refers. Key cards have numbers corresponding to the tabs. Notes are hand written on lines on the cards and the cards are attached to the front leaf of a book.

Recent developments in the area of optical character recognition (OCR) scanning, such as that disclosed in U.S. Pat. No. 5,920,877 to Kolster, make it possible to acquire discrete text strings and organize those strings in a preselected format for later use. Such devices, however, depend upon the scanner's ability to recognize a character based on known OCR techniques, such as geometric OCR, which detects the printed character's shape. Variations in fonts make it difficult to achieve total accuracy with geometric OCR.

U.S. Pat. No. 5,875,261 to Fitzpatrick et al. discloses a method of enhancing spatial character recognition by combining it with color coded OCR. Color coded OCR is a technique involving attempts to recognize a character based on color embedded in the character. For example, red may denote the letter "A", whereas pink denotes the letter "a" and yellow indicates the letter "Y". Color coding, by itself, may be subject to color processing errors involving color intensity, color density, color shifts, and color scanner misalignment. Anything effecting the spectrum, such as saturation or changes in hue, could also effect the processing. Consequently, Fitzpatrick et al. mixes color coding with geometric OCR and utilizes a hypothesis testing technique wherein the geometric OCR is used to generate a null hypothesis that a particular character has been recognized, and an alternative hypothesis that the character has not been recognized. Color coded OCR is then employed to select either the null hypothesis or the alternative hypothesis. This method increases accuracy of the scanning device, however, it is time consuming and requires color printing.

Barcode recognition and processing methods, such as those disclosed in U.S. Pat. No. 4,992,650 to Somerville, U.S. Pat. No. 5,227,616 to Lee, U.S. Pat. No. 5,229,584 to Erickson, and U.S. Pat. No. 5,451,760 to Renvall, provide optical scanning techniques with both speed and accuracy. Barcodes can be used for automatic reproduction of strings of printed marks and characters, however, barcode detracts from a printed page to be read by humans.

SUMMARY OF THE INVENTION

A system is provided for recording and reproducing graphic symbols. An embodiment of the system includes an optical scanning device and a plurality of graphic symbols. The graphic symbols include a spatial symbology embedded within the graphic symbol for detection by the optical scanning device. The embodiment also includes a processor in communication with the optical scanning device for identifying graphic symbols indicated by the spatial symbology. The graphic symbols may be alphanumeric symbols, icons, or pictures. The spatial symbology may be black, white, grey, or any color. Further, the spatial symbology may be the same color as the graphic symbol or a different color. The optical scanning device and the processor may be in electrical communication or wireless communication. The system may also include a microphone in communication with the processor which may be used to orally annotate notes taken with the system. The microphone may be incorporated into the optical scanning device.

A graphic symbol for use with an optical scanning device is also provided. The graphic symbol includes configurations which may be distinguished with a human eye and spatial symbology embedded within the configurations. The spatial symbology is detectable by the optical scanning device for storage and identification. In a preferred embodiment, configurations are alphanumeric. In another embodiment, the spatial symbology indicates the graphic symbol in which it is embedded. In a further embodiment, the spatial symbology indicates a graphic symbol different from the graphic symbol in which it is embedded.

The spatial symbology embedded within the configurations may include one dimensional barcode, two dimensional barcode, morse code or the like or a combination of codes. The spatial symbology may be confined to one area of the graphic symbol, or may be spread out to include a plurality of areas of the graphic symbol. The spatial symbology may be the same color as the configurations or a different color. Embodiments of the invention include documents bearing the graphic symbols. A document may be in physical or electronic form.

A method for recording graphic symbols is also provided. An embodiment of the method includes providing a plurality of graphic symbols, the graphic symbols including a spatial symbology embedded within the graphics. The graphic symbols are scanned with an optical scanning device and the spatial symbology is transmitted to a processor. The processor has a memory and is in communication with the optical scanning device. The graphic symbol is identified by the spatial symbology in the processor. In accordance with another embodiment of the invention, the graphic symbol is identified using geometric OCR techniques in addition to detection of the spatial symbology.

The graphic symbols indicated by the spatial symbology are identified in the processor and may be reproduced in electronic form with a computer monitor. Alternatively, or in addition, the optical scanning device is in communication with a printing device and the graphic symbol is reproduced in physical form by the printing device.

A computer program product for recording and reproducing graphic symbols is also provided. The computer program product comprises a computer usable medium having computer readable program code. The program code includes code for reading spatial symbology detected by the optical scanning device and code for identifying graphic symbols indicated by the spatial symbology. The computer program product may also include code for storing the graphic symbols in a file and program code for translating the spatial symbology detected by the optical scanning device into an image of the graphic symbols.

An additional aspect of the invention involves a method for recording selected passages from written materials is provided. A multiple page text containing spatial symbology embedded in a plurality of graphic symbols is provided. The graphic symbols corresponding to passages, words, or other text selected by a user is scanned with an optical scanning device and the scanning device produces a computer readable representation of the graphic symbols being scanned. The computer readable representation is then transmitted to a processor which interprets the read signals using the spatial symbology and a file containing the selected passages is created.

DETAILED DESCRIPTION OF SPECIFIC EMBODIMENTS

Figure 1:
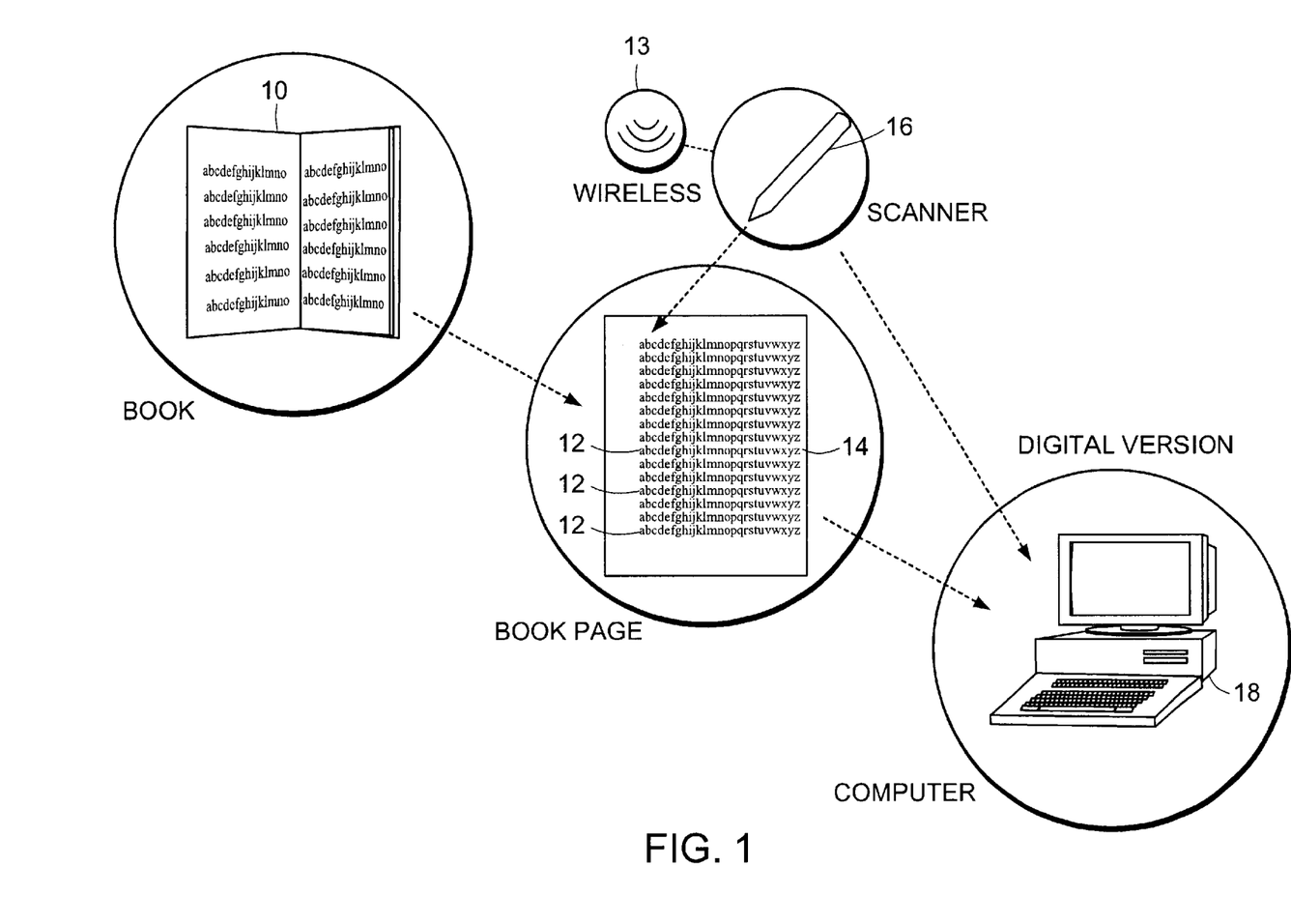
FIG. 1 illustrates a system in accordance with one embodiment of the present invention.

FIG. 1 illustrates a system in accordance with one embodiment of the present invention. A document (e.g., a book, a webpage, a legal brief, etc) 10 contains a plurality of graphic symbols 12. A graphic symbol may be a number, letter, picture, icon or any other mark or image contained in the data base of a processor. The graphic symbols 12 include spatial symbology 14 embedded in the graphic symbol which is scanned by an optical scanning device 16. For purposes of this disclosure, "spatial symbology" is defined as an arrangement of marks, symbols or images, without regard to color, configured to express a data message detectable and interpretable by a scanning device and microprocessor, such as but not limited to a pattern of wide and narrow spaces, dots, lines, or any layout of shapes and spaces. The optical scanning device 16 may be in wireless 13 communication (e.g., using radio frequency or infrared radiation) with a processor 18 which identifies the graphic symbols 12 indicated by the spatial symbology 14. The processor 18 interprets the scanner read signals and retrieves a corresponding graphic symbol from an accompanying digital file, such as a CD. In a preferred embodiment, the graphic symbols may be alphanumeric characters, each of which are associated with code in the file, such as an ASCII code. The processor 18 may store the graphic symbols for further manipulation or reproduce them physically or electronically.

In a most straight forward approach, the spatial symbology 14 represents and is interpreted as the graphic symbol in which it is embedded. In this way, improved character recognition may be accomplished. In an alternate approach, the spatial symbology 14 can be used to provide a hidden meaning. Spatial symbology embedded in the letters of a text may represent and be interpreted as a message unrelated to the text in which it is embedded. In this alternate approach, the spatial symbology and the graphic symbol in which it is embedded do not necessarily match.

Figure 2A:
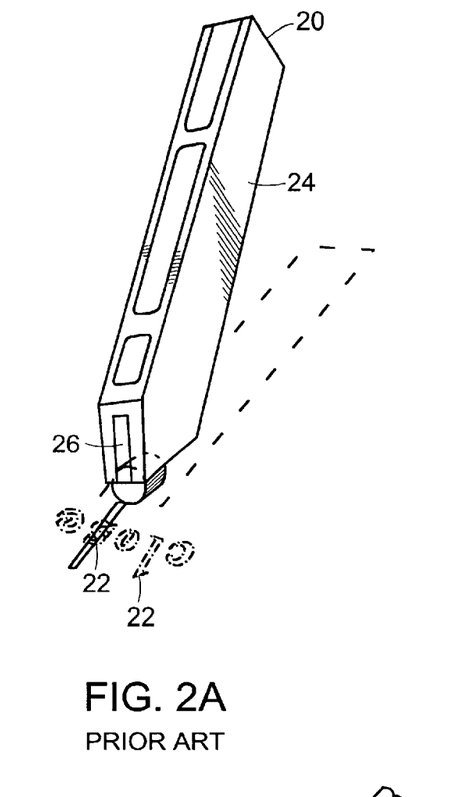
FIG. 2(a) illustrates, in perspective view, an example of an optical scanning device which may be used in preferred embodiments of the present invention.
Figure 2B:
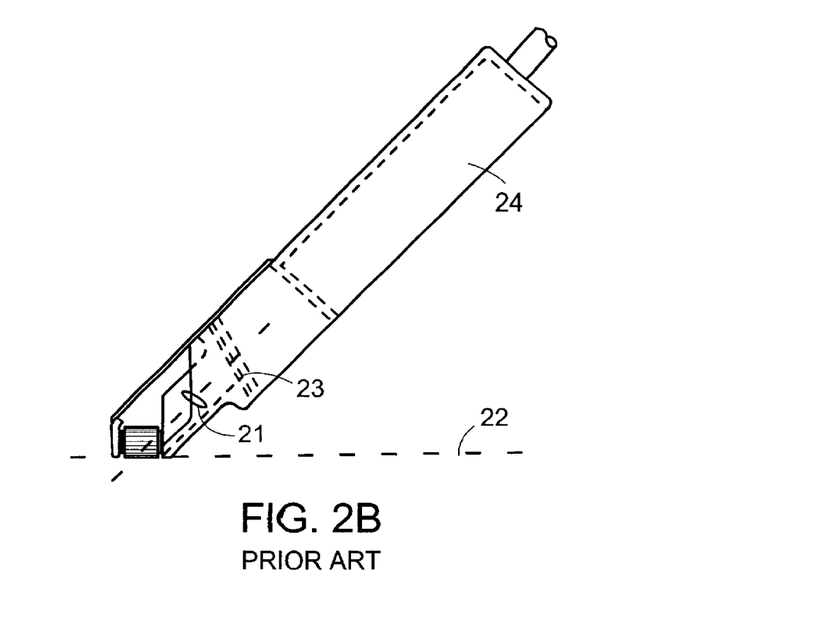
FIG. 2(b) illustrates, in cut away view, the optical scanning device of FIG. 2(a)

FIGS. 2(a) and 2(b) illustrate an example of an optical scanning device which may be used in preferred embodiments of the present invention. The scanning device 20 is described in greater detail in U.S. Pat. No. 5,301,243 to Olschafskie et al. and U.S. Pat. No. 5,574,804 also to Olschafskie et al. both of which are incorporated herein by reference. It is shown scanning a document 22. The scanning device 20 includes a housing 24 adapted to be held in the manner of a pen and moved easily. A movement sensor 26 is mounted to the housing 24 for detecting movement of the scanner across the surface of the document 22. An optical system 28 includes a lens 21 and a diode array detector 23 (FIG. 2(b)). The scanning device 20 makes contact with or projects a beam of light or laser over, across, or along graphic symbols. The computer readable representations are forwarded to a microprocessor. Scanning device 20 produces a computer readable representation of the graphic symbols being scanned with sufficient resolution to detect spatial symbology embedded within the graphic symbol.

Figure 3A:
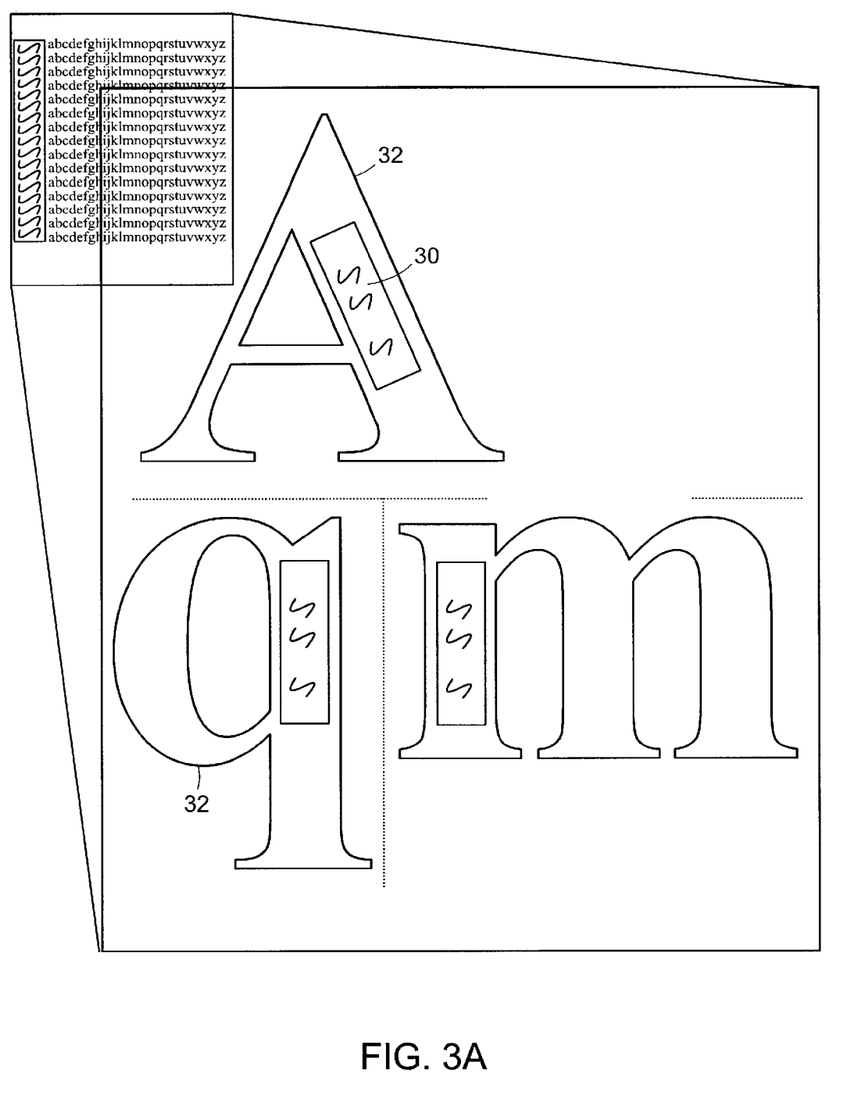
FIG. 3(a) illustrates a graphic symbol in accordance with an embodiment of the present invention wherein spatial symbology is embedded in a single area of graphic symbol.

FIG. 3(a) illustrates a graphic symbol in accordance with an embodiment of the present invention wherein spatial symbology 30 is embedded in a confined area within the graphic symbol 32. As stated above, the spatial symbology 30 may be any arrangement of marks configured to express a data message detectable and interpretable by a scanning device and microprocessor such as, but not limited to, a printed pattern of narrow spaces.

Figure 3B:
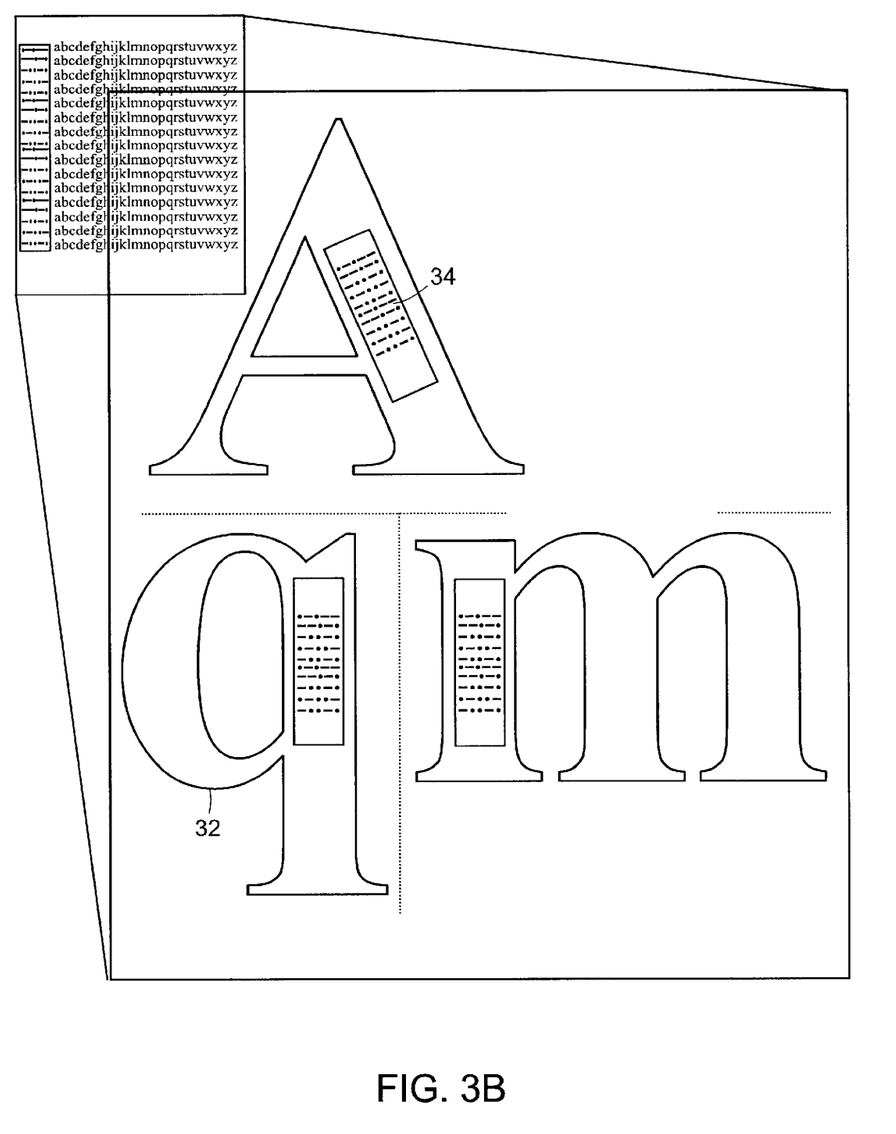
FIG. 3(b) illustrates a graphic symbol in accordance with an embodiment of the present invention wherein morse code is embedded in the graphic symbol.

FIG. 3(b) illustrates a graphic symbol in accordance with an embodiment of the present invention wherein morse code 34 is embedded in the graphic symbol 32. Morse code 34 includes any series of dashes and dots.

Figure 3C:
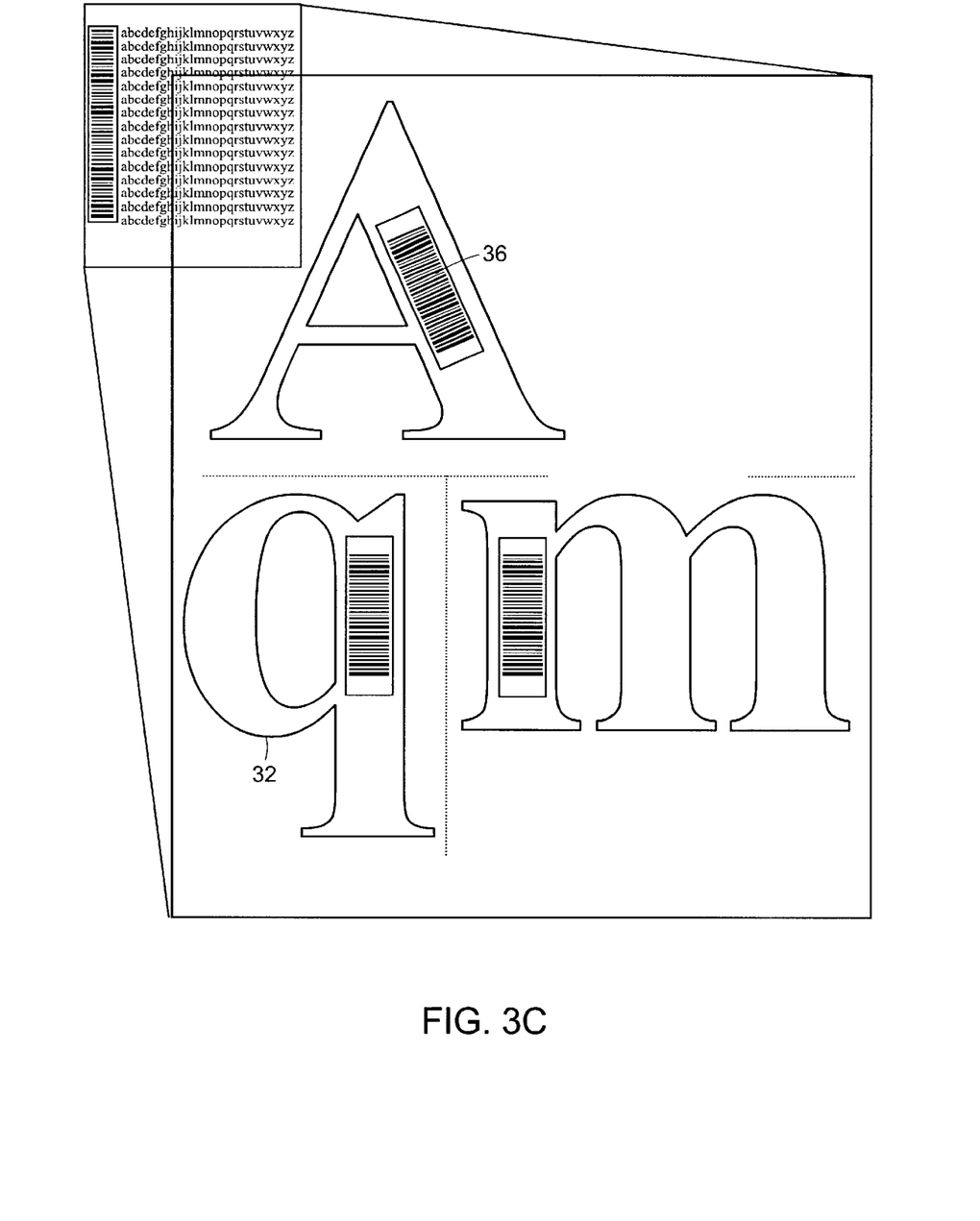
FIG. 3(c) illustrates a graphic symbol in accordance with an embodiment of the present invention wherein barcode is embedded in the graphic symbol.

FIG. 3(c) illustrates a graphic symbol in accordance with an embodiment of the present invention wherein barcode 36 is embedded in the graphic symbol 32. The barcode 36 may be any printed pattern of narrow spaces aligned vertically, horizontally, or circularly with respect to the document.

Alternatively, the bar code may be a two-dimensional array of spaces (e.g., a checkerboard or bull's eye configuration).

Figure 3D:
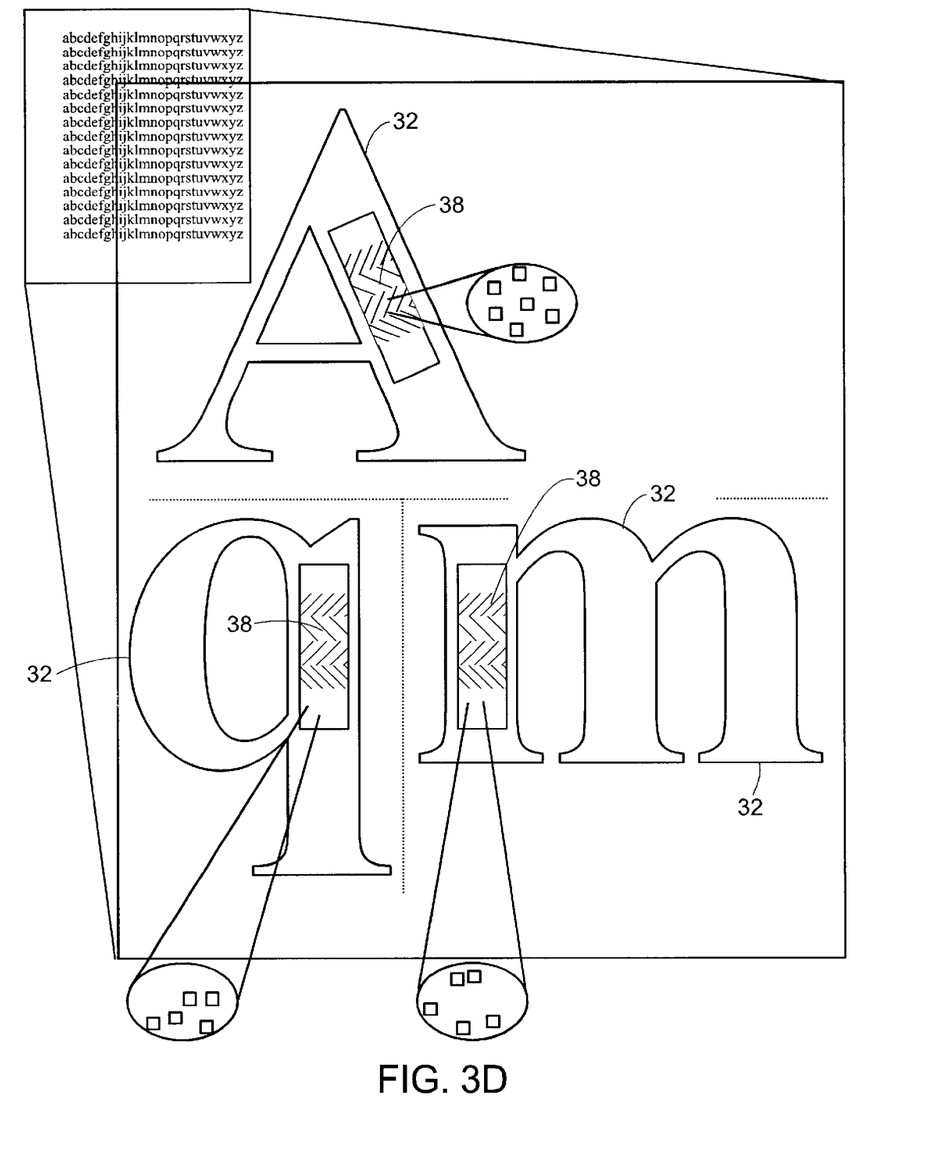
FIG. 3(d) illustrates a graphic symbol in accordance with an embodiment of the present invention wherein colored spatial symbology is embedded in the graphic symbol.

FIG. 3(d) illustrates a graphic symbol in accordance with an embodiment of the present invention wherein colored spatial symbology 38 are embedded in the graphic symbol 32. It should be noted that, in this embodiment, color is employed to distinguish the spatial symbology from other marks in the graphic symbol. Thus, the particular color used is not relevant. Indeed, "color" as used herein refers to black, white, and gray in addition to the full spectrum of colors. When color is used to make the spatial symbology, the scanning device must use its ability to discriminate between colors. Software will be included for use by the processor 18 to use appropriate thresholds to distinguish the spatial symbology marks from the graphic symbol.

Figure 3E:
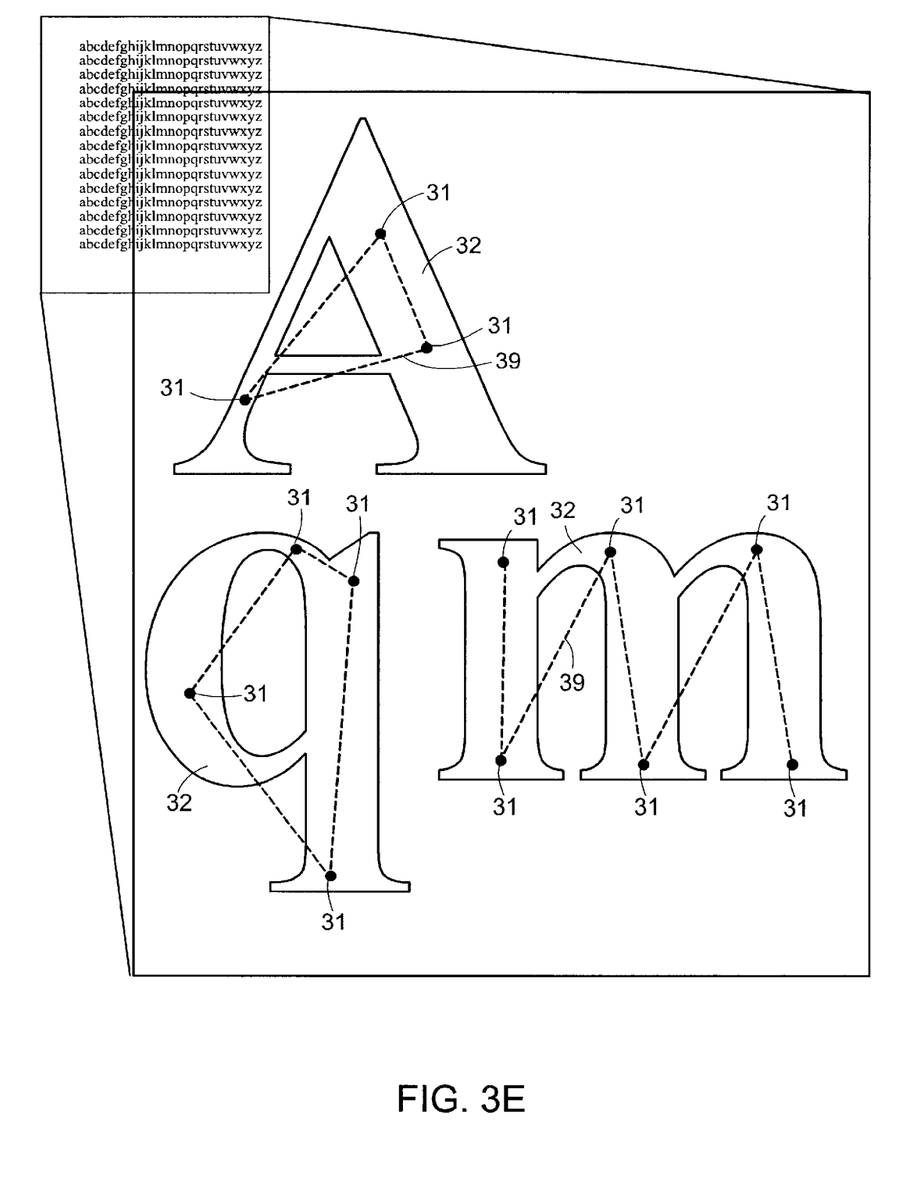
FIG. 3(e) illustrates a graphic symbol in accordance with an embodiment of the present invention wherein spatial symbology is embedded in a plurality of areas of the graphic symbol.

FIG. 3(e) illustrates a graphic symbol in accordance with an embodiment of the invention wherein spatial symbology 31 is embedded in a plurality of areas of the graphic symbol 32. In this embodiment, the arrangement of spatial symbology within the graphic symbol 32, shown here by the dotted lines 39, supplies the information necessary to identify the graphic symbol in the processor.

Printing of the above-described graphic symbols can be accomplished by providing a new font in a printing utility program that incorporates the spatial symbology into the graphic symbol. A more preferred method of printing would be to provide a spatial symbology overlay that could be used with most or all fonts. A printing utility to accomplish the spatial symbology overlay would eliminate pixels of the underlying graphic symbol and substitute the corresponding spatial symbology. Such an overlay would work effectively with most or all fonts and the resulting printed characters would permit highly accurate character recognition based upon the spatial symbology.

Figure 4:
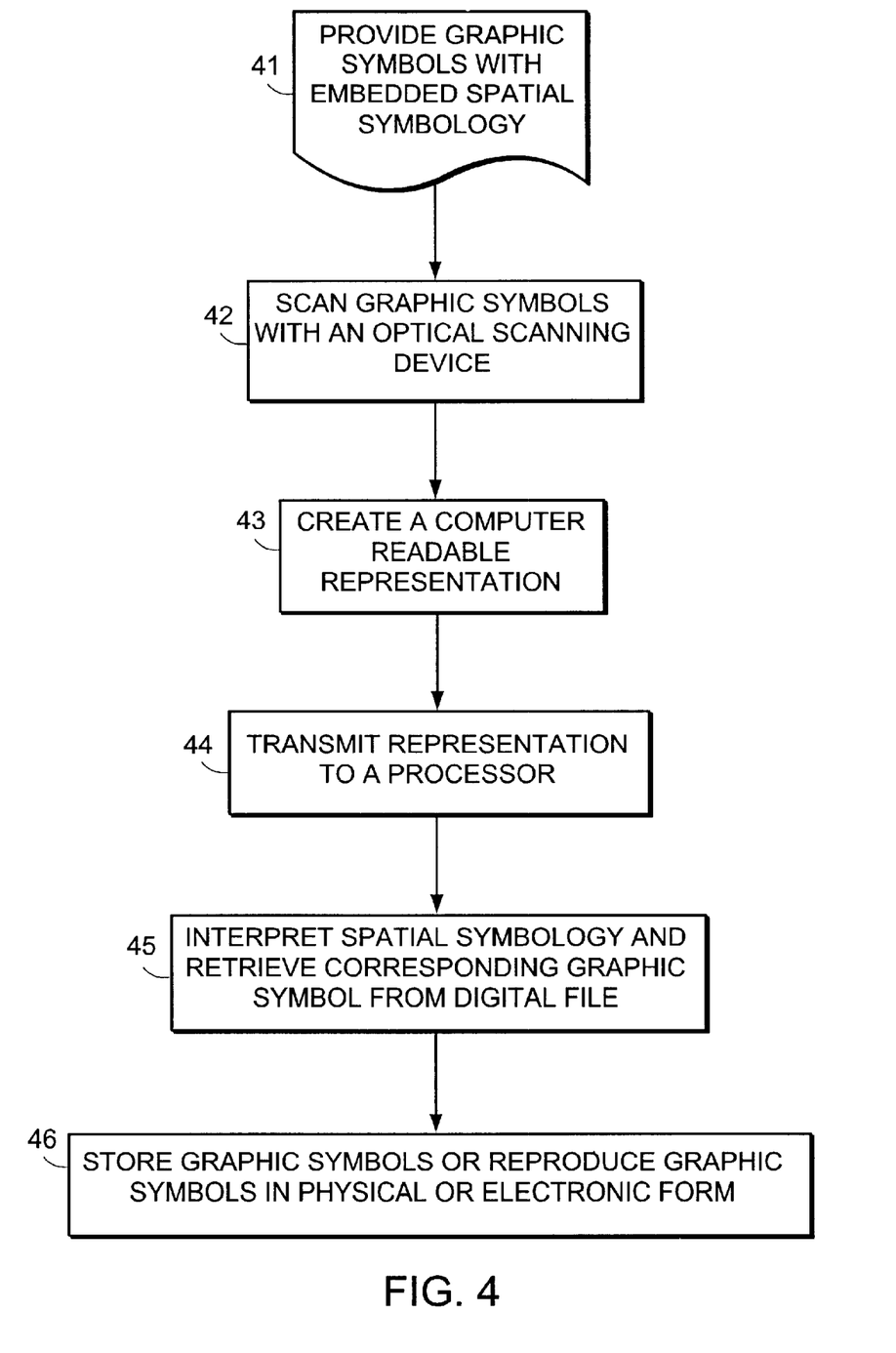
FIG. 4 is a flow chart illustrating a method in accordance with an embodiment of the present invention wherein graphic symbols are indicated by spatial symbology.

FIG. 4 is a flow chart illustrating a method in accordance with an embodiment of the present invention wherein graphic symbols are recognized by embedded spatial symbology. Graphic symbols as described in FIGS. 3 (a)–(e), wherein spatial symbology is embedded in the graphic symbol, are provided on a document 41. The embedded spatial symbology is preferably of small size such that it is undetectable by the human eye but is detectable by an optical scanning device. The graphic symbols are scanned 42 with an optical scanning device which produces a computer readable representation of the graphic symbols being scanned 43. The computer readable representation is then transmitted to a processor 44 and the processor interprets the spatial symbology and retrieves a corresponding graphic symbol from an accompanying digital file on a hard drive, CD-Rom, or the like 45. Graphic symbols may be identified by a digital code, such as the ASCII code for alphanumeric characters. The identities of the selected graphic symbols may then be stored for later use or reproduced in physical or electronic form as 46.

Figure 5:
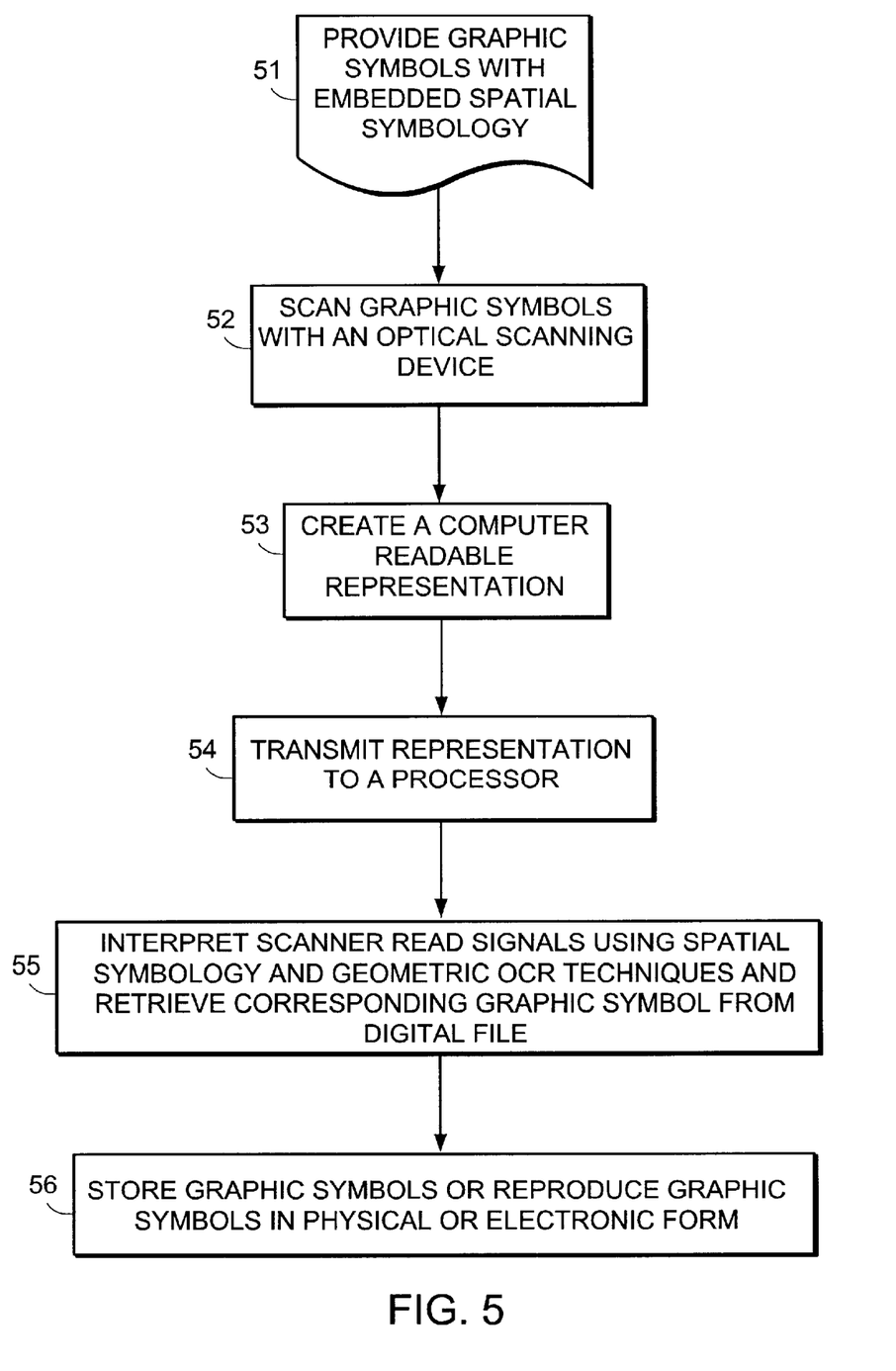
FIG. 5 is a flow chart illustrating a method in accordance with an embodiment of the present invention wherein graphic symbols are identified using spatial symbology and geometric OCR techniques.

FIG. 5 is a flow chart illustrating a method in accordance with an embodiment of the present invention wherein graphic symbols are identified using spatial symbology and spatial OCR techniques. Graphic symbols are provided wherein spatial symbology is embedded in the graphic symbol 51. The graphic symbols are scanned 52 with an optical scanning device which produces a computer readable representation of the graphic symbols being scanned 53. The computer readable representation is then transmitted to a processor 54. The processor interprets the scanner read signals using the spatial symbology and spatial OCR techniques. Any indeterminancy in one technique can be rectified by considering the results of the other technique. The processor retrieves the determined graphic symbol from an accompanying digital file on a hard drive, CD-Rom, or the like 55. The identities of the selected graphic symbols may then be stored for later use or reproduced in physical or electronic form 56.

Figure 6:
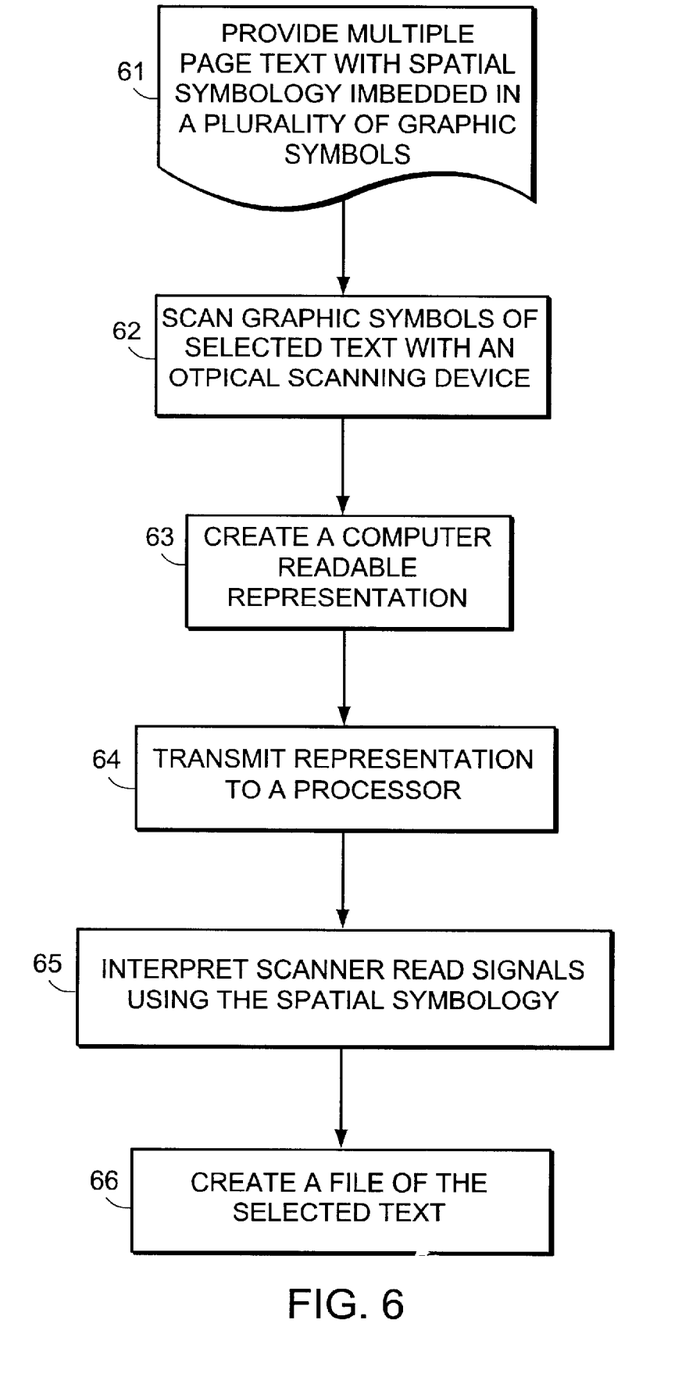
FIG. 6 is a flow chart illustrating a method for recording selected passages from written materials.

FIG. 6 is a flow chart illustrating a method for recording selected passages from written materials. A multiple page text containing spatial symbology embedded in a plurality of graphic symbols is provided 61. The graphic symbols corresponding to passages, words, or other text selected by a user is scanned with an optical scanning device 62. The optical scanning device produces a computer readable representation of the graphic symbols being scanned 63. The computer readable representation is then transmitted to a processor 64. The processor interprets the read signals using the spatial symbology 65. A file containing the selected passages is created 66.

Figure 7:
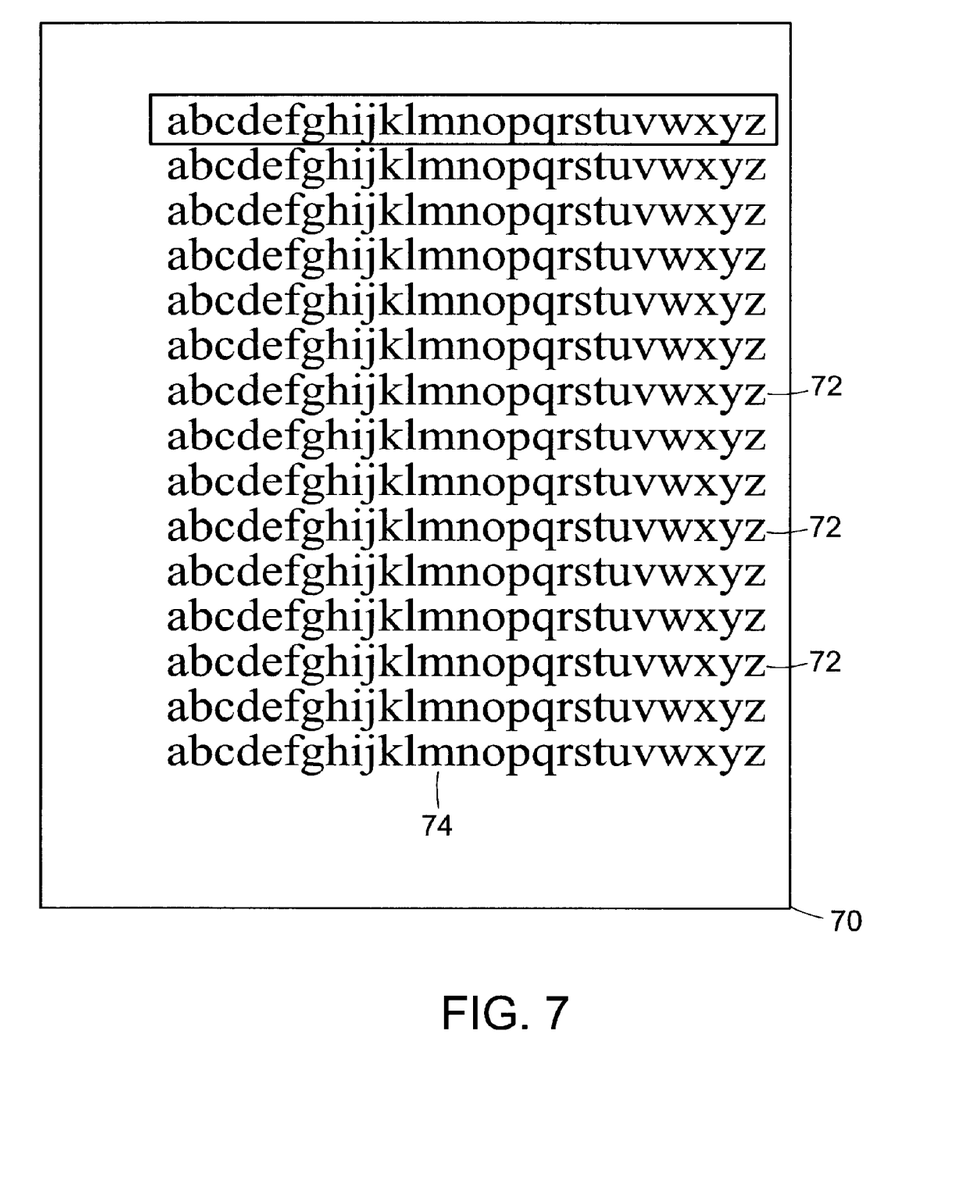
FIG. 7 is an illustration of a document in accordance with an embodiment of the present invention.

FIG. 7 is an illustration of a document 70 in accordance with an embodiment of the present invention. The document 70 may be in physical, printed form such as a book, page, card, etc. The document 70 may also be in electronic form such as a word processing document or a webpage. The document 70 includes graphic symbols 72 which may be distinguished and interpreted by a human eye and the graphic symbols 72 include spatial symbology 74 embedded in the graphic symbol 72 which is invisible to the human eye but detectable by an optical scanning device. The graphic symbols are typically alphanumeric and punctuation symbols.

The methods and apparatuses of the present invention provide a fast, reliable way to store, record, and reproduce written text. Students, and others relying on prior authority, may simply scan a document and have any part of it stored for later use or reproduced instantaneously in electronic or physical form. While scanning, oral annotations may be recorded through a microphone. Research and citations for thesis papers, essays, legal briefs, research papers, and other documents may be compiled quickly and efficiently. Other uses and advantages of the invention will be apparent to those skilled in the art.

It should be understood that various changes and modifications to the preferred embodiment described above will also be apparent to those skilled in the art. For example, the graphic symbols may be letters or symbols associated with any alphabet or even pictures or pictographs. Any of a variety of code reading algorithms may be employed alone or in combination with any of a variety of additional code reading or character recognition algorithms to identify a scanned graphic symbol. These and other modifications can be made without departing from the spirit and scope of the invention and without diminishing its attendant advantages. It is therefore intended that such changes and modifications be covered by the following claims.

What is claimed is:

1. A system for recording and reproducing graphic symbols, the system comprising:
   an optical scanning device;
   a plurality of graphic symbols, the graphic symbols each including spatial symbology embedded within the graphic symbol for detection by the optical scanning device, wherein the spatial symbology is different from the graphic symbol; and
   a processor in communication with the optical scanning device for identifying graphic symbols indicated by the spatial symbology.

2. A system according to claim 1, wherein the graphic symbols include alphanumeric characters.

3. A system according to claim 1, wherein the spatial symbology indicates the graphic symbol in which it is embedded.

4. A system according to claim 1, wherein the spatial symbology indicates a graphic symbol different from the graphic symbol in which it is embedded.

5. A system according to claim 1, further comprising:
a microphone, the microphone in communication with the processor.

6. A system according to claim 5, wherein the microphone is incorporated into the optical scanning device.

7. A system according to claim 1, wherein the spatial symbology includes barcode.

8. A system according to claim 1, wherein the spatial symbology includes morse code.

9. A system according to claim 1, wherein the spatial symbology is a different color than the graphic symbol.

10. A system according to claim 1, wherein the spatial symbology is embedded in a plurality of areas within the graphic symbol to form an identifiable pattern.

11. A system according to claim 1, wherein the optical scanning device and the processor are in wireless communication.

12. A graphic symbol for use with an optical scanning device, the graphic symbol comprising:
a configuration which may be distinguished with a human eye; and
spatial symbology embedded within the configuration detectable by the optical scanning device for the identification of the configuration, the spatial symbology being different from the graphic symbol.

13. A graphic symbol according to claim 12, further comprising color embedded within the configuration detectable by the optical scanning device for identification of the configuration.

14. A graphic symbol according to claim 12, wherein the spatial symbology is undetectable to a human eye.

15. A graphic symbol according to claim 12, wherein the configuration includes an alphanumeric character.

16. A graphic symbol according to claim 12, wherein the spatial symbology indicates the graphic symbol in which it is embedded.

17. A graphic symbol according to claim 12, wherein the spatial symbology indicates a graphic symbol different from the graphic symbol in which it is embedded.

18. A graphic symbol according to claim 12, wherein the spatial symbology includes bar code.

19. A graphic symbol according to claim 12, wherein the spatial symbology includes morse code.

20. A graphic symbol according to claim 12, wherein the spatial symbology is a different color than the configuration.

21. A graphic symbol according to claim 12, where the spatial symbology is embedded in a plurality of areas within the configuration to form an identifiable pattern.

22. A method for recording graphic symbols, the method comprising:
providing a plurality of graphic symbols, the graphic symbols including [a] spatial symbology embedded within the graphic symbols, wherein the spatial symbology is different from the graphic symbols;
scanning the graphic symbols with an optical scanning device;
creating a computer readable representation with the optical scanning device;
transmitting the computer readable representation to a processor;
identifying, in the processor, the spatial symbology in the computer representation; and
identifying the graphic symbols corresponding to the spatial symbology.

23. A method according to claim 22, further comprising:
providing a geometric optical character recognition program; and
wherein identifying the graphic symbols further includes considering the outcome of the geometric optical recognition program.

24. A method according to claim 22, further comprising reproducing the identified graphic symbols in electronic form with the computer monitor.

25. A method according to claim 22, further comprising reproducing the identified graphic symbols in physical form with a printing device.

26. A method according to claim 22, wherein the spatial symbology indicates the graphic symbol in which it is embedded.

27. A method according to claim 22, wherein the spatial symbology indicates a graphic symbol different from the graphic symbol in which it is embedded.

28. A method according to claim 22, wherein the spatial symbology includes bar code.

29. A method according to claim 22, wherein the spatial symbology includes morse code.

30. A method according to claim 22, wherein the spatial symbology is a different color than the graphic symbol.

31. A method according to claim 22, wherein the spatial symbology is embedded in a plurality of areas within the graphic symbol to form an identifiable pattern.

32. A computer program product for recording and reproducing graphic symbols, the computer program product comprising a computer usable medium having computer readable program code including:
program code for reading spatial symbology embedded in a computer readable representation of a graphic symbol, wherein the spatial symbology is different from the graphic symbol; and
program code for identifying the graphic symbol, including program code for using the spatial symbology to select a corresponding graphic symbol.

33. A computer program product according to claim 32, further comprising:
program code for reproducing the graphic symbol.

34. A computer program product according to claim 32, further comprising:
program code for identifying color.

35. A computer program product according to claim 32, wherein the program code for reproducing the graphic symbol includes sending a message to a printing device to print the graphic symbol.

36. A computer program product according to claim 32, wherein the program code for reproducing causes the graphic symbol to become electronically displayed.

37. A method for recording selected passages from written materials, the method comprising:
providing a multiple page text, the text including a plurality of graphic symbols arranged in a plurality of paragraphs, the graphic symbols including a spatial symbology embedded within the graphic symbols, wherein the spatial symbology is different from the graphic symbols;
scanning the graphic symbols corresponding to selected passages with an optical scanning device;

creating a computer readable representation with the optical scanning device;

transmitting the computer readable representation to a processor;

identifying, in the processor, the spatial symbology in the computer readable representation; and creating a file of the selected passages from the multiple page text, recording oral annotations to the selected passages through the microphone.

38. A method according to claim 37, wherein the processor is in communication with a computer monitor and further comprising:

reproducing the graphic symbols in electronic form on a computer monitor.

39. A method according to claim 37, further comprising:

providing a microphone, the microphone being in communication with the processor; and recording oral annotations to the selected passages through the microphone.

40. A document for use with a note taking system, the document being in physical or electronic form and comprising:

graphic symbols, the graphic symbols including configurations which may be distinguished with a human eye; and spatial symbology embedded within the configurations detectable by an optical scanning device, the spatial symbology being different from the graphic symbols.

41. A document according to claim 40, wherein the spatial symbology indicates the graphic symbol in which it is embedded.

42. A document according to claim 40, wherein the spatial symbology indicates a graphic symbol different from the graphic symbol in which it is embedded.

43. A document according to claim 40, wherein the spatial symbology includes bar code.

44. A document according to claim 40, wherein the spatial symbology includes morse code.

45. A document according to claim 40, wherein the spatial symbology is a different color than the graphic symbol.

46. A document according to claim 40, wherein the spatial symbology is embedded in a plurality of areas within the graphic symbol to form an identifiable pattern.

47. A method for recording and reproducing graphic symbols, the method comprising:

reading spatial symbology embedded in a computer readable representation of a graphic symbol, the spatial symbology being different from the graphic symbol;

identifying the graphic symbol from the spatial symbology;

using the spatial symbology to select a corresponding graphic symbol; and reproducing the identified graphic symbol.

48. A method according to claim 47, further comprising:

providing a geometric optical character recognition program; and wherein identifying the graphic symbols further includes considering the outcome of the geometric optical recognition program.

49. A method according to claim 47, further comprising:

identifying color associated with the spatial symbology.

50. A method according to claim 47, wherein the spatial symbology is a different color than the graphic symbol.

51. A method according to claim 47, wherein the spatial symbology indicates the graphic symbol in which it is embedded.

52. A method according to claim 47, wherein the spatial symbology indicates a graphic symbol different from the graphic symbol in which it is embedded.

53. A method according to claim 47, wherein the spatial symbology includes bar code.

54. A method according to claim 47, wherein the spatial symbology includes morse code.

55. A method according to claim 47, wherein the spatial symbology is embedded in a plurality of areas within the graphic symbol to form an identifiable pattern.

56. A method according to claim 47, wherein reproducing the graphic symbol includes sending a message to a printing device to print the graphic symbol.

57. A method according to claim 47, wherein reproducing the graphic symbol causes the graphic symbol to become electronically displayed.

* * * * *